United States Patent [19]

Lucas

[11] 4,213,708
[45] Jul. 22, 1980

[54] GRAININESS SENSOR

[75] Inventor: John M. Lucas, Montreal, Canada

[73] Assignee: Domtar Inc., Montreal, Canada

[21] Appl. No.: 934,406

[22] Filed: Aug. 17, 1978

[30] Foreign Application Priority Data

Jun. 27, 1978 [CA] Canada .................................. 306279

[51] Int. Cl.² .............................................. G01N 21/30
[52] U.S. Cl. .................................... 356/429; 250/559;
356/446
[58] Field of Search ............... 356/429, 430, 445, 446,
356/447, 448; 250/559, 562, 571, 572

[56] References Cited

U.S. PATENT DOCUMENTS

| 3,736,065 | 5/1973 | Cushing et al. | 250/572 |
| 4,007,457 | 2/1977 | Aeppli | 340/677 |
| 4,019,066 | 4/1977 | Lucas et al. | 356/445 |
| 4,092,068 | 5/1978 | Lucas et al. | 356/446 |

*Primary Examiner*—John K. Corbin
*Assistant Examiner*—R. A. Rosenberger
*Attorney, Agent, or Firm*—C. A. Rowley

[57] ABSTRACT

The degree of graininess or grainy edges of a traveling web may be discriminated utilizing the present invention which relates to a method and apparatus for generating a topographic signal by sensing scattered light from instantaneously illuminated areas of less than 1 mm in diameter on the surface of the web, processing at least a significant amount of said signal representative of topographic features of the web of selected lengths in the direction of travel of said web of at least 1.5 mm to determine the amount of such features of said selected length, said selected lengths contributing significantly to the graininess of the web, and thereby providing an indication of the graininess of said web.

12 Claims, 13 Drawing Figures

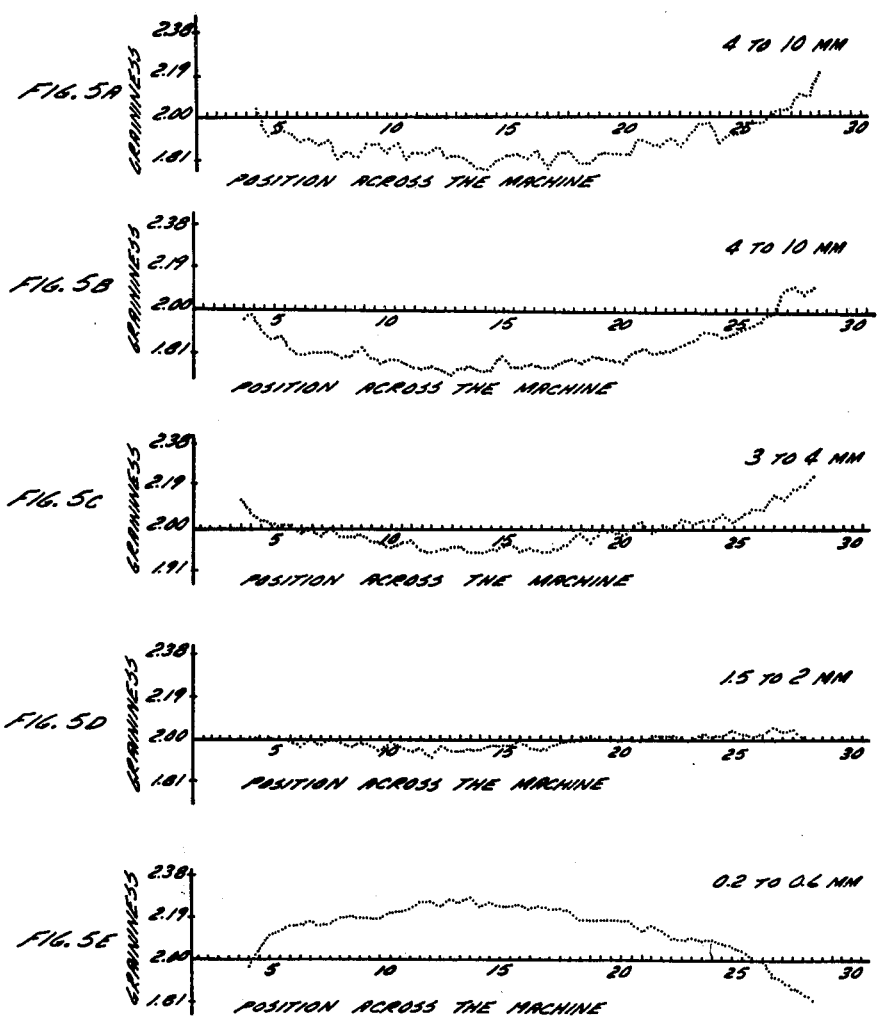

UNEQUAL ROUGHNESS
EQUAL GRAININESS

EQUAL ROUGHNESS
UNEQUAL GRAININESS

GRAININESS SENSOR

FIELD OF THE INVENTION

Present invention relates to on-line sensing of graininess characteristics of a paper sheet. More specifically the present invention relates to a method and apparatus for optically sensing the surface roughness of the paper sheet thereby to generate an electrical signal representative of the roughness of the sheet and further processing the signal to determine graininess.

PRIOR ART

"Grainy edges" or more generally "graininess" is used throughout this disclosure to describe a surface characteristic of the paper. Graininess or grainy edges describe a condition generally imparted to the web by excess cross direction shrinkage (normally at the edge of the sheet) which result in a series of raised ribs in the machine direction and forms a sort of micro-creeping or micro-creped texture on the web. As indicated, this normally occurs at each edge of the paper, however, sometimes such a graininess texture occurs on the sheet at locations spaced significantly inwardly from the side edges of the sheet.

No graininess measuring device exists and there is no quantitative method currently available for determining graininess or degree of graininess other than visual assessment by expert observers.

BRIEF DESCRIPTION OF THE INVENTION

It is the object of the present invention to provide a device for quantitatively assessing the degree of graininess of a web of paper.

To obtain the object of the present invention it is preferred to produce a topographic signal with a sensor of the type disclosed in U.S. Pat. No. 4,092,068 issued May 30, 1978 to Lucas and Gracovetsky which incorporates at least one pair of detectors preferably arranged in a cross-machine direction on opposite sides of an area illuminated by the sensor which area provides a succession of instantaneously illuminated spots of less than about 1 mm in diameter on the surface of the traveling paper. Each detector generates a signal based on the amount of light reflected to it from the illuminated spots. These signals are subtracted to obtain a topographic signal indication of roughness of the traveling paper sheet being examined by the sensor. The root mean square of the topographic signal so generated provides a roughness signal that correlates well with the surface roughness of the sheet.

The above described sensor is preferred but other sensors may also be used to generate the required topographic signal. For example, the sensor disclosed in U.S. Pat. No. 4,019,066 issued Apr. 19, 1977 to the same inventors may be used. It is essential that the signal generated represent small features in the surface of the web, and when an optical sensor is used of the types described hereinabove, sensing scattered light reflected from instantaneously illuminated areas, each of the areas should be no greater than 1 mm in diameter and preferably even smaller. The topographic signal as used herein must be representative of a surface roughness of the sheet and contain information on other properties of the web surface such as the amount of features having certain characteristics of length.

Broadly the present invention relates to on-line graininess sensing by sensing scattered light from instantaneous areas of less than 1 mm in diameter illuminated on the surface of a sheet traveling relative to the sensor, thereby to generate a topographic signal, processing said topographic signal to select at least a significant portion of said signal representative of surface features of selected lengths in the direction of travel of the web of at least 1.5 mm, said selected lengths contributing significantly to graininess of the web, and to determine the amount of said features of said selected length, thereby to obtain an indication of degree of graininess of the web in the areas sensed.

More preferably, the invention will provide a quantitative indication of graininess and will broadly comprise means for sensing scattered light from instantaneously illuminated areas of less than 1 millimeter in diameter on the surface of travelling web, thereby to generate a topographic signal, means for processing said topographic signal to provide a first signal that is significantly influenced by the amount of surface features of a selected length in the direction of travel of said web of at least 1.5 millimeters and having a significant contribution to graininess, means to provide a second signal that is significantly influenced by surface features on said web of less than 1.5 millimeter length in said direction of travel, means for averaging said first and second signals and means for determining the ratio of said averages, thereby to obtain an indication of degree of graininess of said web in the areas sensed.

In its preferred form, the present invention provides a quantitative indication of graininess and comprises; sensing scattered light from instantaneously illuminated areas of less than 1 mm in diameter on the surface of a traveling web, thereby to generate a topographic signal, processing the topographic signals through a filter to separate a pass frequency range from a blocked frequency range, one of said pass frequency range and said blocked frequency range comprising a significant portion of frequencies representative of surface features of selected lengths in the direction of travel of the web of at least 1.5 mm, and that contribute significantly to graininess thereby to provide a first signal having a significant portion of its power determined by surface features that contribute significantly to graininess; providing a second signal that includes at least a significant portion of said blocked frequency range averaging said first and said second signals and determining the ratio of said average signals to obtain an indication of the degree of graininess of the web in the areas sensed.

Preferably the second signal will contain substantially all of said topographic signal so that the average of this signal will provide an indication of the roughness and the pass frequency range will comprise frequencies generated by a selected range of surface features between 3 and 10 mm in length.

BRIEF DESCRIPTION OF THE DRAWINGS

Further features, objects and advantages will be evident from the following detailed description of the preferred embodiments of the present invention, taken in conjunction with the accompanying drawings in which:

FIGS. 5, A, B, C, D and E are graphs of graininess vs position across the machine using machine direction or a cross-machine direction sensors, sensing different length features of the surface of the sheet.

DETAILED DESCRIPTION OF THE PREFERRED EMBODIMENTS

Figure 7A:
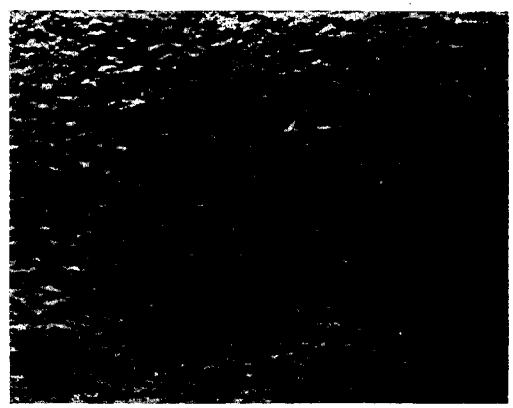
FIGS. 7A and B are photographs of a non-grainy and grainy sheet of paper respectively enlarged to 5.5 magnification.
Figure 7B:
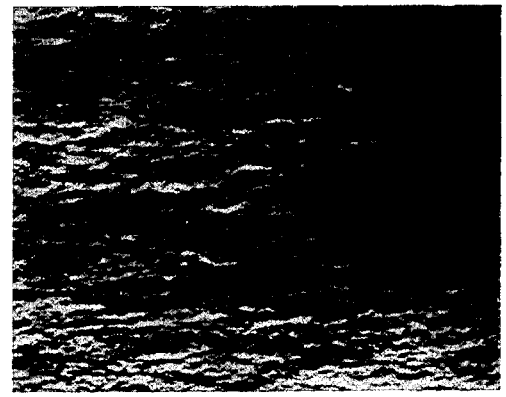

Before discussing the present invention attention is directed to FIGS. 7A and 7B which demonstrate what is meant by the term "graininess" by comparing a "non-grainy" portion of a sheet with a grainy portion. It will be noted that the grainy portion has pronounced elongated ridges extending in the direction of travel of the sheet (FIG. 7B) whereas the non-grainy portion has substantially random roughness (FIG. 7A). In both photographs the machine direction is from left to right. These photographs were taken in different areas of the same sheet and the surface "roughness" as determined using the backing of U.S. Pat. No. 4,092,068 are substantially the same.

Figure 1:
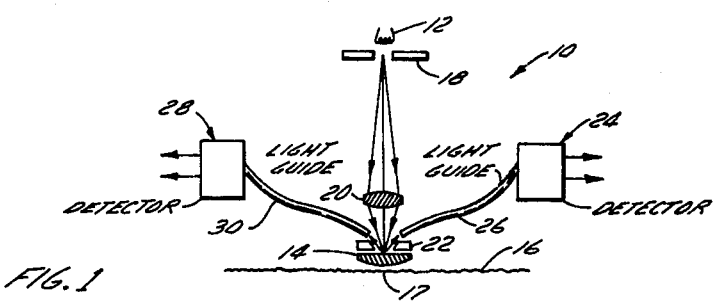
FIG. 1 is a schematic illustration of the sensing mechanism used in conjunction with the present invention.

Referring to FIG. 1, the preferred sensor used in the present invention as above indicated is a subject matter of U.S. Pat. No. 4,092,068 Sensor 10 is composed of a light source 12 for directing a light beam through a window 14, thereby to illuminate at any one time an instantaneous area 17 on the surface 16 being scanned. Light passes through the aperture 18 which limits the area of the source 12 and a lens 20 which focuses the light through aperture 22 and window 14 to illuminate the instantaneous areas 17 on the surface 16. A beam of light from source 12 is projected perpendicular to surface 16 and will be of an area of less than about 1 millimeter and preferably between 0.1 and 0.2 millimeters in diameter.

A pair of detectors such as those schematically illustrated at 24 and 28 are suitably positioned about sensor 10 to detect light reflected from the spot or area 17. The detectors preferably are located on opposite sides of the light source 12 i.e. on diagonally opposed sides of the light source 12 and preferably in a plane extending substantially perpendicular to the direction of travel or machine direction of the paper web being sensed. Similar results can be obtained using detectors arranged at different angles, however, the best signal is obtained using detectors positioned on opposite sides of the illuminated spot and in the plane substantially perpendicular to the direction of web travel. In the illustrated arrangement reflected light is conveyed to the detectors 24 and 28 by a suitable optical means comprising for example fibre light guides 26 and 30 respectively.

As described in the said U.S. Pat. No. 4,099,068 detectors 24 and 28 each generate a signal, of which, say from detector 28 is inverted and added to the signal of the other detector (detector 24). The resultant signal which forms a topographic signal in line 32 is preferably filtered as indicated by the filter 33 to eliminate some of the noise generated by signals below about 0.2 and above 40 KHz frequency range (assuming a web speed of about 1000 ft. per minute). This filter 33 is particularly important if the sensor of U.S. Pat. No. 4,019,066 is used, and must be used to eliminate the DC component and permit only the AC frequencies to pass. This signal that forms what is referred to herein as the topographic signal in line 32 is an AC signal with the DC component if any suitably eliminated.

Figure 2:
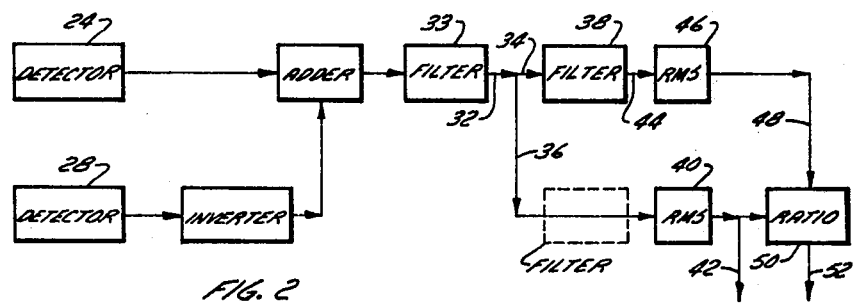
FIG. 2 is a schematic representation of the processing of the signals to obtain quantitative information of the degree of graininess of the surface in accordance with the present invention.

The topographic signal in line 32 may be processed in many ways to obtain an indication of graininess, but in the preferred embodiment, as illustrated in FIG. 2, this topographic signal is conveyed by via lines 34 and 36 to a band pass filter 38 and a root means square calculator 40 respectfully. If desired the filter 33 may be displaced to line 36 and filter only the signal passing to the root mean square calculator 40. The output of the root means square calculator 40 provides a clear indication of the roughness of the sheet being scanned as indicated by the arrow 42.

In the arrangement of FIG. 2 the topographic signal in line 34 is filtered via the band pass filter 38 and the frequencies passing through the band pass filter 38 to line 44 are processed via a root mean square calculator 46 to provide a signal in line 48. This signal is transmitted to a ratioing means 50 which provides the ratio between the roughness signal 42 and the signal in line 48 to form a graininess signal indicated at 52.

To obtain a quantitative indication of graininess, it has been found that certain frequencies only of the topographic signal must be separated and therefore in the preferred arrangement of FIG. 2 the band pass filter must be specifically selected to pass only certain selected low frequencies i.e. to look at features on the paper having only certain selected lengths. These lengths should be equivalent to lengths of approximately 1.5 to 10 mm and preferably about 4 to 10 mm. It will be apparent that the opposite could be done, namely the band pass filter could be used that only pass the higher frequency signals and an alternative ratio found i.e. only shorter length features passed, however, it is preferred to utilize only a low frequency band to obtain the signal and to compare the signal with the roughness signal to produce the ratio indicating graininess. Utilizing the higher frequency signals provides an inverse ratio to that obtained when using the low frequency filter.

Obviously to so sense surface features of a selected length along the surface the band pass filter frequency characteristics must be correlated with the machine speed.

As a specific example, if one is to sense the surface traveling at 100 m a minute for features of 1 mm length the frequency examined would have to be about 1.7 KHz.

As indicated, there is no quantitative tests for graininess, and to establish a correlation between the results of the present invention and the actual graininess of the sample being sensed, it was necessary to first rank the samples and a scientifically accepted procedure for ranking the samples by pairs was used for the purpose. This procedure has been described in detail in "Visual sheet quality correlates with small scale opacity changes" a paper published in the Pulp & Paper Canada by Rutland and Heintze on Mar. 1978.

The all pairs panel ranking procedure requires that all possible pair combinations of samples in a set be ranked by pair by pair presentation to a succession of observers. Each observer thus identifies the grainier sample of all possible sample pair combinations, scores are recorded and consensus between observers determined. The logical consistency of the pairs comparisons made by individual observers and hence the degree of discrimination underlining their choice is also evaluated. For example, if samples A & B are chosen as respectively more or less grainier in pair comparisons against a third sample C, direct comparision of A and B must result in A being identified as grainier than B for logical consistency of the sample triad at A, B, C. The results of these tests are a relatively accurate indication of degree of graininess. A graininess profile for a given machine or comparison between a pair of machines may be obtained by comparison of appropriate sample pairs. The errors in graininess profile using this technique correspond approximately to standard deviation of the average scores.

Figure 3:
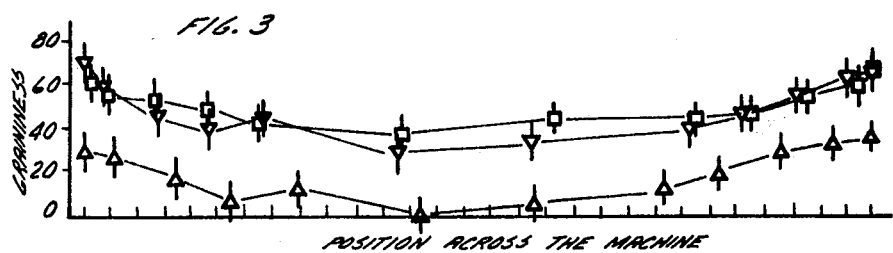
FIG. 3 are those cross-machine profiles based on visual examination by experts in an all pairs ranking test for three different papers and different position across each paper web.
Figure 4:
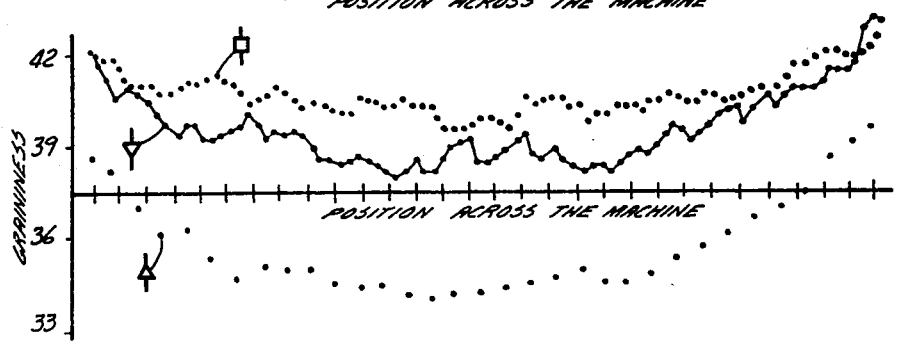
FIG. 4 is a similar plot of graininess produced utilizing the present invention on the same papers as representated in FIG. 3.

It will be noted from a comparison of FIGS. 3 and 4 that the on-line sensor results found using the present invention and shown in FIG. 4 corresponds with the all pairs ranking scores plotted in FIG. 3 (the top line in FIG. 4 corresponds with the squares in FIG. 3, the middle line with the inverted triangles and the bottom line with the upright triangles respectively).

It is possible to obtain a meaningful result even if the selected frequency range includes some irrelevant information. Thus, while it is preferred to operate, as above indicated, in the feature size range of 3 to 10 mm it is quite acceptable to operate with frequencies representing features of say from 1.5 mm and longer, since this will include the 3 to 10 mm length together with some relatively unimportant signals generated by smaller length features and other irrelevant information generated by long length features. In order words, the more representative signals will be generated by sensing the 3 to 10 mm features but inclusion of other frequencies will not render the results meaningless.

Attention is directed to FIG. 5. FIG. 5A is based on using sensors aligned in the machine direction as opposed to the cross-machine direction. It will be noted that a very meaningful signal is obtained when the frequencies representative of 4 to 10 mm length features are selected (compare FIG. 5A with FIG. 5B). However, the signal is not as strong and is further reduced if other feature sizes are used and is not as clear an indication as is obtained using the cross-machine direction aligned sensors. The machine direction arrangement of detectors generated a feature length signal of about 25% of the equivalent signal obtained with the detectors arranged across the machine. It is for this reason that applicant prefers to use the cross-machine sensors which provide a stronger signal for indicating graininess.

Comparing FIGS. 5, B, C, D, E, which are graphs of graininess based on different sized features being selected, it will be noted that at 4 to 10 mm (FIG. 5B) generates a strong signal indicating graininess and that this corresponds with the actual graininess of the sheet as shown in the comparision of FIGS. 3 and 4.

The graph in FIG. 5C also corresponds reasonably accurately with graininess and is based on features of 3 to 4 mm length. FIG. 5D is a graph using only 1.5 to 2 mm features and it will be noted it provides virtually no indication of graininess. FIG. 5E selects features of 0.2 to 0.6 mm and shows an inverse graph of the graininess detected in FIGS. 5B and 5C and thus makes it apparent that the smaller features only may be sensed and an inverse indication of graininess be obtained, which, as above indicated is quite logical since the graininess measurement as used in the preferred arrangement hereinabove described is formed by dividing a signal into two parts and taking the ratio of one of the parts to total signal or to each other. There is a definite relationship or ratio between the ratios obtained using one or the other parts of the signal in combination with the total signal or with each other and thus a part of the signal other than that directly representing feature lengths over 1.5 may be used to determine graininess.

It will be apparent from the above that a narrow range of feature size may be used to determine graininess or alternatively a wide range i.e. from 1.5 mm up may be used, provided the signal generated by the features representative of graininess, features in the 3 to 10 mm length range form a significant portion of the processed signal i.e. the amount of irrelevant signal is not sufficient to significantly cloud the signal generated by the graininess features. Conversely a similar indication of graininess can be obtained in an inverse fashion by processing only that portion of the total signal that is available after a significant portion of the signal representative of features determining graininess has been removed or eliminated.

It will also be apparent that if the ratio of a signal passed by the filter to the total of the signal provides a meaningful indication of graininess, the reciprocal will also provide a meaningful indication as will a ratio of the pass frequencies to the frequencies that are not passed by the filter. To employ the latter technique requires that the topographic signal be filtered by a high pass filter and by a low pass filter (in parallel). The low pass filter passes frequencies generated by features on the surface over 1.5 mm (preferably 4–10 mm) and the high pass filter passes only relatively short features on the surface up of to about 3 mm (preferably less than 1.5 mm). A ratio of the root mean squares of these signals passed through the filters provides adequate indication of graininess.

In the above described embodiments the averaging technique used is root mean square, however, other conventional techniques for averaging the AC topographic signal may be used to provide meaningful results relating to graininess and ratioing these results to ensure that the graininess indicator is substantially free of roughness.

Figure 6A:
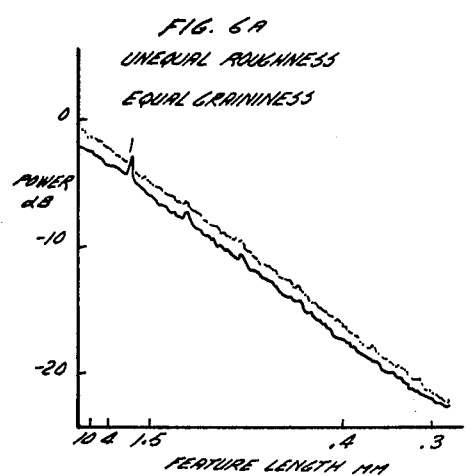
FIGS. 6A and B are graphs of topographic feature length (on a linear scale of corresponding frequency) vs power in decibels.
Figure 6B:
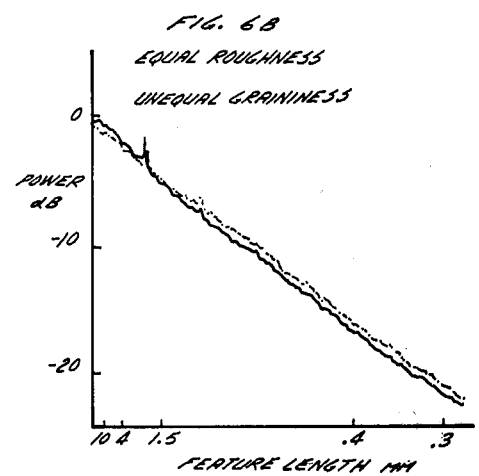

Yet another way of analysing the topograhic signal in line 32 to obtain an indication of roughness is demonstrated in FIGS. 6A & B . In these figures a frequency spectrum of the signal is provided by the plot of power in decibels vs feature length (linear frequency scale). The lines generated in FIGS. 6A & B are substantially straight lines indicating that the maximum power is at the low frequency end of the specturm i.e. the frequencies representative of longer length surface features. In a non-grainy sheet, the graph is a straight line and simply shifts in vertical position depending on the roughness of the sheet being sensed (FIG. 6A). However, when a grainy sheet is sensed (FIG. 6B) the straight line characteristic is only applicable to feature lengths below 1.5 mm and power attributed to the longer feature sis not in the normal proportion so that the slope of the graph changes and curves upwardly to indicate the unusual magnitude of longer length surface features on the grainy sheet. Any means for detecting this change in power in the low frequency portion of the curve over the expected power based on the high frequency portion of the curve (feature lengths below about 1.5 mm) of the topographic signal will provide an indication of graininess of the sheet.

In some cases, an absolute value of graininess is unnecessary e.g. if all one is interested is in the effect of a change made to the equipment on the graininess characteristics of the sheet assuming that the roughness characteristics remain substantially constant, then such indication can be obtained by only monitoring the change in the signal corresponding to the feature sizes of a selected range greater than 1.5 mm and including a significant portion of features contributing to graininess, preferably over 3 mm and less than 10 mm in length in the direction of travel of the web.

Clearly an analysis of the frequency spectrum of the topographic signal will provide an indication of the degree of graininess by comparing the slope of the curve of frequency vs power for that portion of curve generated by the low frequency (long length features) with the high frequency portion of the spectrum i.e. if the slope of this curve changes significantly at the low frequency end of the spectrum the amount of change of slope will be an indication of the graininess of the sample being tested.

The present invention has dealt primarily with power vs frequency to obtain an indication of the graininess. However, other modes of examining the signal may be used provided they are sensitive to the long feature lengths on the surface of the web as above described.

Generally graininess is a characteristic important in the finished paper and would thus normally be measured after calendering. It has been found however that the instant invention is operative to sense graininess of a web before calendering and as such may prove to be an useful tool in analysing the development of graininess during paper manufacture, and curing the problem.

Modifications may be made without departing from the spirit of the invention as defined in the appended claims.

I claim:

1. An apparatus for determining graininess of a traveling paper web comprising means for moving a paper web relative to a sensing means; said sensing means including means for illuminating an area of less than 1 mm in diameter on said web thereby to instantaneously illuminate a succession of spots on the surface of the moving web as they pass said sensing means and detector means positioned to receive scattered light from said illuminated spots thereby to generate a topographic signal; filter means for filtering said topographic signal to separate a pass frequency range from a blocked frequency range, one of said pass frequency range and said blocked frequency range containing only a selected range of frequencies of said topographic signal; said selected range of frequency representing topographic features of said web of selected lengths in the direction of travel of said web of at least 1.5 mm and that contribute significantly to graininess thereby to provide a first signal having a significant portion of its power determined by surface features that contribute significantly to the graininess of said web; means for averaging said first signal; means for averaging a second signal derived from said topographic signal said second signal including at least a major portion of said blocked frequency range; and means for determining the ratio of said averages thereby to obtain a quantitative indication of the graininess of said web.

2. An apparatus as determined in claim 1 wherein said detector means comprising a pair of detectors circumferentially spaced relative to said instantaneous spots each said detector generating a signal and wherein said topographic signal is generated by subtracting the signal generated by one of said detectors from the signal generated by the other.

3. An apparatus as defined in claim 2 wherein said pair of detectors are positioned in a plane extending substantially perpendicular to the direction of the travel of said web on opposite sides of said areas.

4. An apparatus as defined in claims 1, 2 or 3 wherein said filter means is a band pass filter that passes frequencies representative of features extending in the direction of travel of said web of between 3 and 10 mm in length.

5. An apparatus as defined in claims 1, 2 or 3 wherein said second signal includes substantially all of said topographic signal.

6. An apparatus as defined in claims 1, 2 or 3 wherein each said means for averaging determines the root mean squares.

7. An apparatus for determing graininess of the traveling paper web comprising means for moving said paper web relative to a sensing means, said sensing means, including means for illuminating an area of less than 1 millimeter in diameter on the surface of said web thereby to instantaneously illuminate a succession of spots on the surface of the moving web as they pass said sensing means and detector means positioned to receive scattered light from said illuminated spots, thereby to generate a topographic signal, means for processing said topographic signal to provide a first signal, that is significantly influenced by the amount of surface features of a selected length in the direction of travel web of at least 1.5 millimeters and having a significant contribution to graininess, means to provide a second signal that is significantly influenced by surface features on said web of less than 1.5 millimeter length in said direction of travel, means for averaging said first and second signals, and means for determining the ratio of said averages to obtain an indication of degree of graininess of said web in said areas sensed.

8. A method for determining the graininess of a traveling web of paper comprising; sensing amounts of scattered light from instantaneously illuminated spots on the surface of said traveling web and generating a topographic signal; providing a first signal by processing said topographic signal by filtering said topographic signal to separate a pass frequency range from a blocked frequency range, one of said pass frequency range and said blocked frequency range comprising a significant portion of frequencies representing surface features of selected lengths in the direction of travel of the web of at least 1.5 mm and that contribute significantly to graininess thereby to provide a first signal having a significant portion of its power determined by surface features that contribute significantly to the graininess of said web; providing a second signal from said topographical signal, said second signal including at least a major portion of said blocked frequency range; averaging each of said first and said second signals and determining the ratio of said averages thereby to obtain a quantitative indication of the graininess of said web.

9. A method as defined in claim 8 wherein said pass frequency range represents topograhic features between 1.5 and 10 mm in length in the direction of the travel of the web.

10. A method as defined in claim 8 wherein pass frequency represents topographic features of less than 1.5 mm in length.

11. A method as defined in claim 8 wherein said pass frequency range represents topographical features of between 3 and 10 mm in length.

12. A method as defined in claims 9, 10 or 11 wherein said second signal includes substantially all of said topographic signal.

* * * * *